(No Model.)  2 Sheets—Sheet 1.

W. F. & S. E. LIMPUS.
SULKY.

No. 518,507.  Patented Apr. 17, 1894.

WITNESSES  
William F. Limpus  
Sherman E. Limpus  
INVENTORS by — Attorney (No Model.) 2 Sheets—Sheet 2.
W. F. & S. E. LIMPUS.
SULKY.
No. 518,507. Patented Apr. 17, 1894.
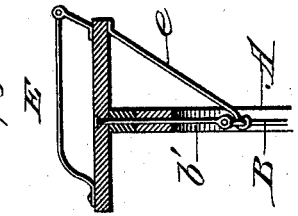
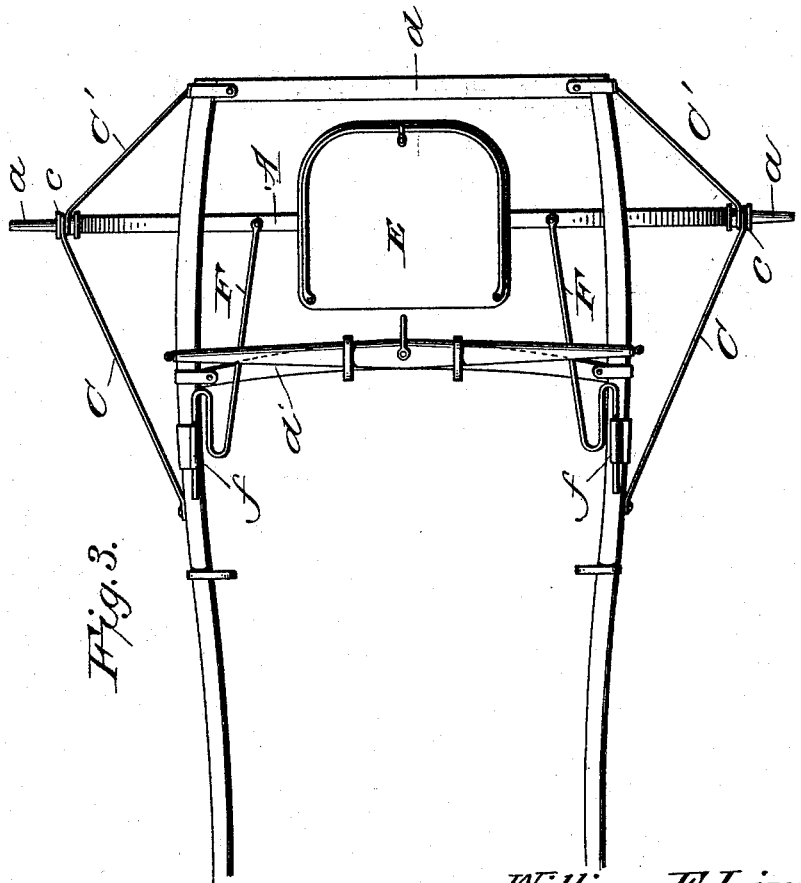
William F. Limpus,
Sherman E. Limpus,
INVENTORS
WITNESSES
by
Attorney

UNITED STATES PATENT OFFICE.

WILLIAM F. LIMPUS AND SHERMAN E. LIMPUS, OF ALPINE, INDIANA.

SULKY.

SPECIFICATION forming part of Letters Patent No. 518,507, dated April 17, 1894.

Application filed April 20, 1893. Renewed December 21, 1893. Serial No. 494,358. (No model.)

*To all whom it may concern:*

Be it known that we, WILLIAM F. LIMPUS and SHERMAN E. LIMPUS, citizens of the United States of America, residing at Alpine, in the county of Fayette and State of Indiana, have invented certain new and useful Improvements in Sulkies; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the invention is to provide a sulky or road cart with means whereby the shafts are movably connected to the axle so that the movement of the horse will not be imparted to the seat but will be taken up by springs carried by the shafts or thills and engaging with the axle. And the invention consists in pivotally connecting the shafts or thills with the axle and providing springs for taking up the horse motion and stirrups or foot-rests which are carried by the axle and are held in movable engagement with the shafts, as will be hereinafter fully set forth, and particularly pointed out in the claims.

Figure 1:
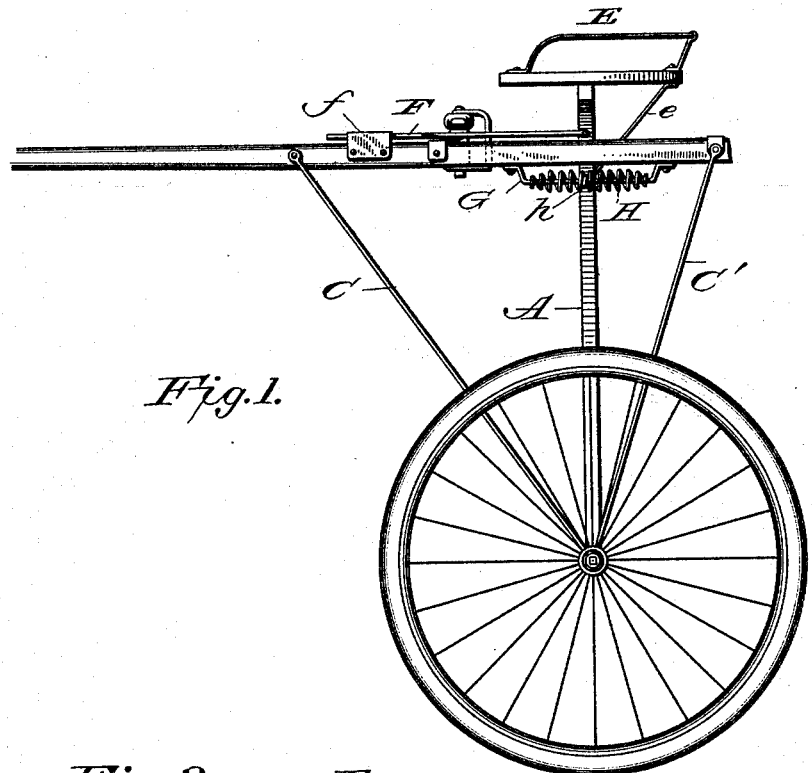
Figure 2:
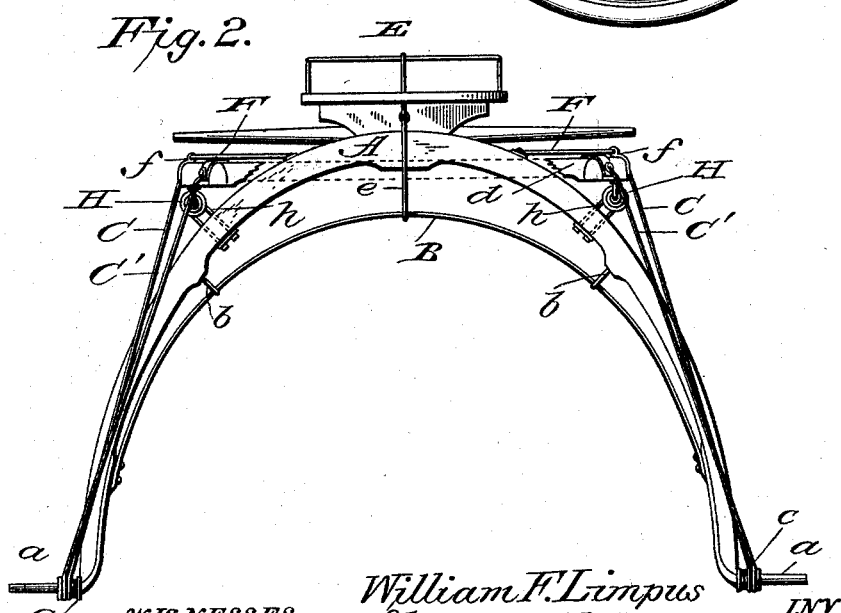

In the accompanying drawings, forming part of this specification, Figure 1 is a side view of a sulky constructed in accordance with our invention. Fig. 2 is a rear elevation with the supporting wheels detached. Fig. 3 is a plan view, and Fig. 4 is a detail sectional view of the seat, and Fig. 5 is a sectional view of the socket, showing a modification.

A designates the arched axle to the ends of which are attached spindles $a$ $a$ upon which the supporting-wheels are mounted. Beneath the axle is secured a brace-rod B the ends of which are connected directly to the axle while at intermediate points said brace-rod is connected to the axle by short rods $b$ provided with tightening nuts as shown. It will be observed that the curve of the brace-rod and axle are different, so that by drawing upon the short rods $b$ the strain upon the brace-rod can be varied. The inner ends of the spindles are provided with sleeves, $c$, over which are bent the lower ends of the thill supporting rods C and C′, said rods being attached to the thills on each side of the axle. The thills are connected to each other at their rear ends by a cross-bar $d$, and at a suitable distance in front of the axle by a cross-bar $d'$ to which the single-tree is attached. It will be noted that when these parts are connected as hereinbefore described the thills will have a pivotal movement on the axle, which movement will be limited by the arched axle which extends above the thills and against which the cross-bars of the thills will abut. The arched axle carries centrally a seat E, which is braced by a rod $e$ extending to the brace-rod B or to the eye of the short rod $b'$.

F designates the stirrups or foot-rests, which are attached to the axle A and are bent or looped as shown in Fig. 3, the ends being passed through sockets $f$ carried by the thills. It will be noted that these foot-rests move in unison with the seat and axle, and, if desired, on each side of the sockets may be located springs which will engage with the foot-rests and limit the swinging movement of the axle with respect to the thills. The springs may be located within the sockets.

In practice we prefer to provide the under side of the thills with a bar G having upwardly extended ends so that the major portion of said bar will lie below the end portions of the thills, and this bar carries a helical spring H. The bar is also encircled by a staple $h$ which is attached to the axle, said staple serving to limit the movement of the thills with respect to the axle. The staples engage with the spring and permit a rocking movement of the axle and seat with respect to the thills, which will take up the motion imparted to this class of vehicles by the horse in trotting. By providing the staples $h$ the axle and thills may have a lateral movement with respect to each other, and the oscillating movement is taken up by the springs hereinbefore referred to. When the springs H are employed the bars forming the stirrups are pivotally attached at their rear ends to the axle, but when the springs H are dispensed with said bars are rigidly secured to the axle and will reduce the lateral movement to the minimum.

Having thus described our invention, what we claim as new, and desire to secure by Letters Patent, is—

1. In a sulky, the combination of an axle having thills or shafts pivotally connected thereto, and stirrups attached to the axle and held in movable engagement with the thills, for the purpose set forth.

2. In a sulky, the combination of the arched axle carrying a seat, thills connected to the axle by rods so that the axle and thills will be held in pivotal engagement with each other, and stirrups or foot-rests secured at one end to the axle and held in movable engagement with the thills, substantially as shown, and for the purpose set forth.

3. In a sulky, the combination with the thills and axle pivotally connected to each other and provided with bent bars forming stirrups, one of the ends of said bars being held in rigid engagement with the axle while the other ends enter sockets carried by the thills, and springs for limiting the swinging or pivotal movement of the thills with respect to the axle, for the purpose set forth.

4. In a sulky, the combination of an arched axle having at its lower ends spindles upon which the supporting wheels are mounted, brace-rods extending from the lower ends of the axle to the thills on each side of the axle, springs carried by the thills and means for connecting the axle with said springs to limit the swinging movement of the axle and thills with respect to each other, substantially as shown.

5. In a sulky, the combination of an axle carrying a seat and having supporting wheels connected thereto, rods or bars pivotally connecting the thills to the axle, said thills carrying a bar which is encircled by a spring, and means for holding the axle in engagement with said bar and spring, for the purpose set forth.

6. In a sulky, the combination of an axle having supporting wheels and seat, bars carried by the thills, said bars being provided with springs, loops attached to the axle and adapted to encircle the bars carried by the thills and engage with the springs on said bars, substantially as shown, and for the purpose set forth.

7. In a sulky having the thills pivotally connected to the axle, bars carried by the thills, springs encircling said bars, and a staple or loop attached to the axle and adapted to engage with the springs, each spring being made of a single piece with the central part of which the loop engages, so that both end portions of the spring will act upon the loop, one of the end portions being compressed while the other is expanded.

In testimony whereof we affix our signatures in presence of two witnesses.

WILLIAM F. LIMPUS.
SHERMAN E. LIMPUS.

Witnesses:
WM. SEAL,
JOHN H. GRAY.